May 8, 1934.　　　　G. H. COOK　　　　1,957,578
SEMIAUTOMATIC TRANSMISSION
Filed Oct. 24, 1932　　3 Sheets-Sheet 1

INVENTOR.
Geo H. Cook.
Geo Stevens.
ATTY.

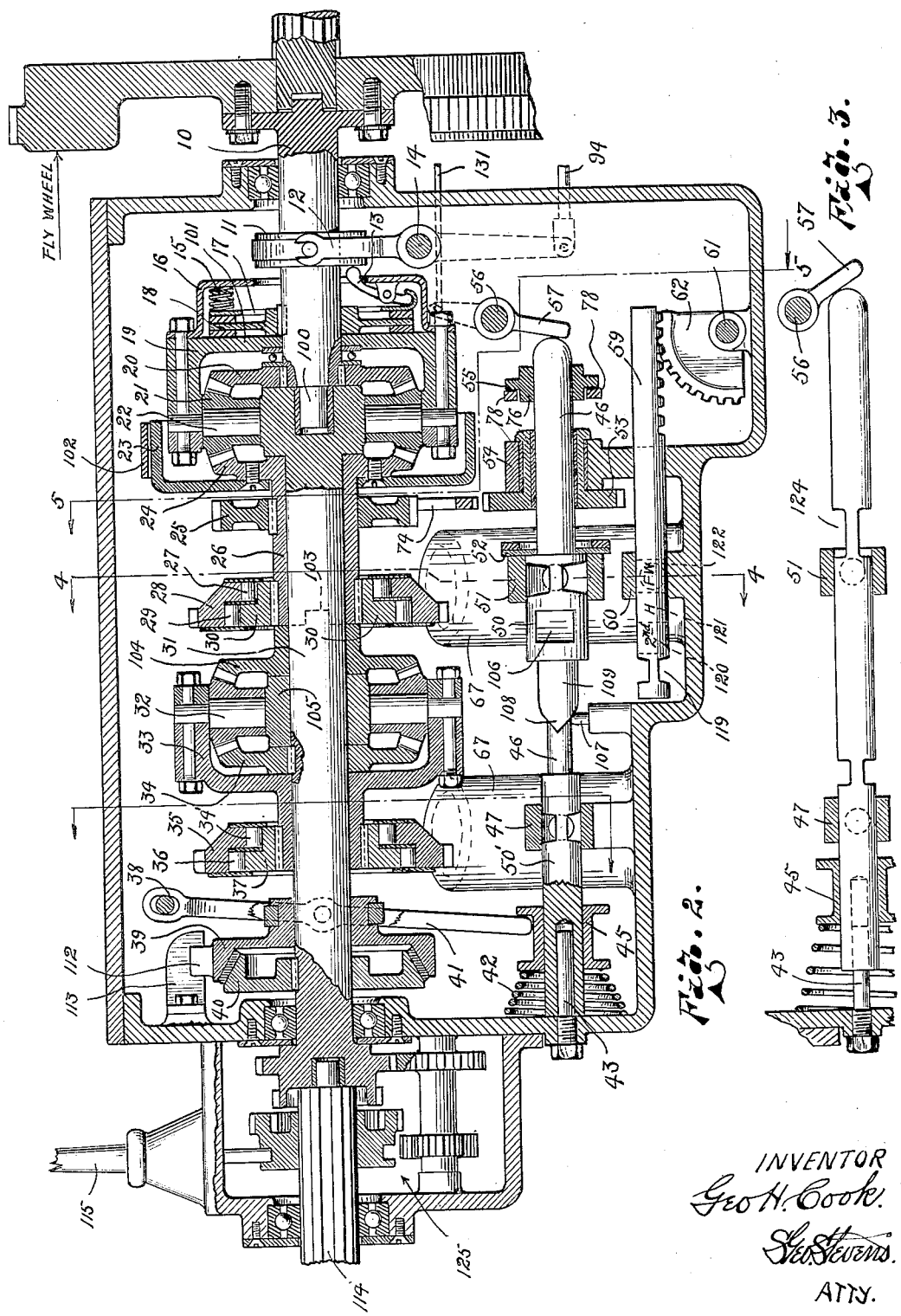

May 8, 1934.  G. H. COOK  1,957,578
SEMIAUTOMATIC TRANSMISSION
Filed Oct. 24, 1932   3 Sheets-Sheet 3
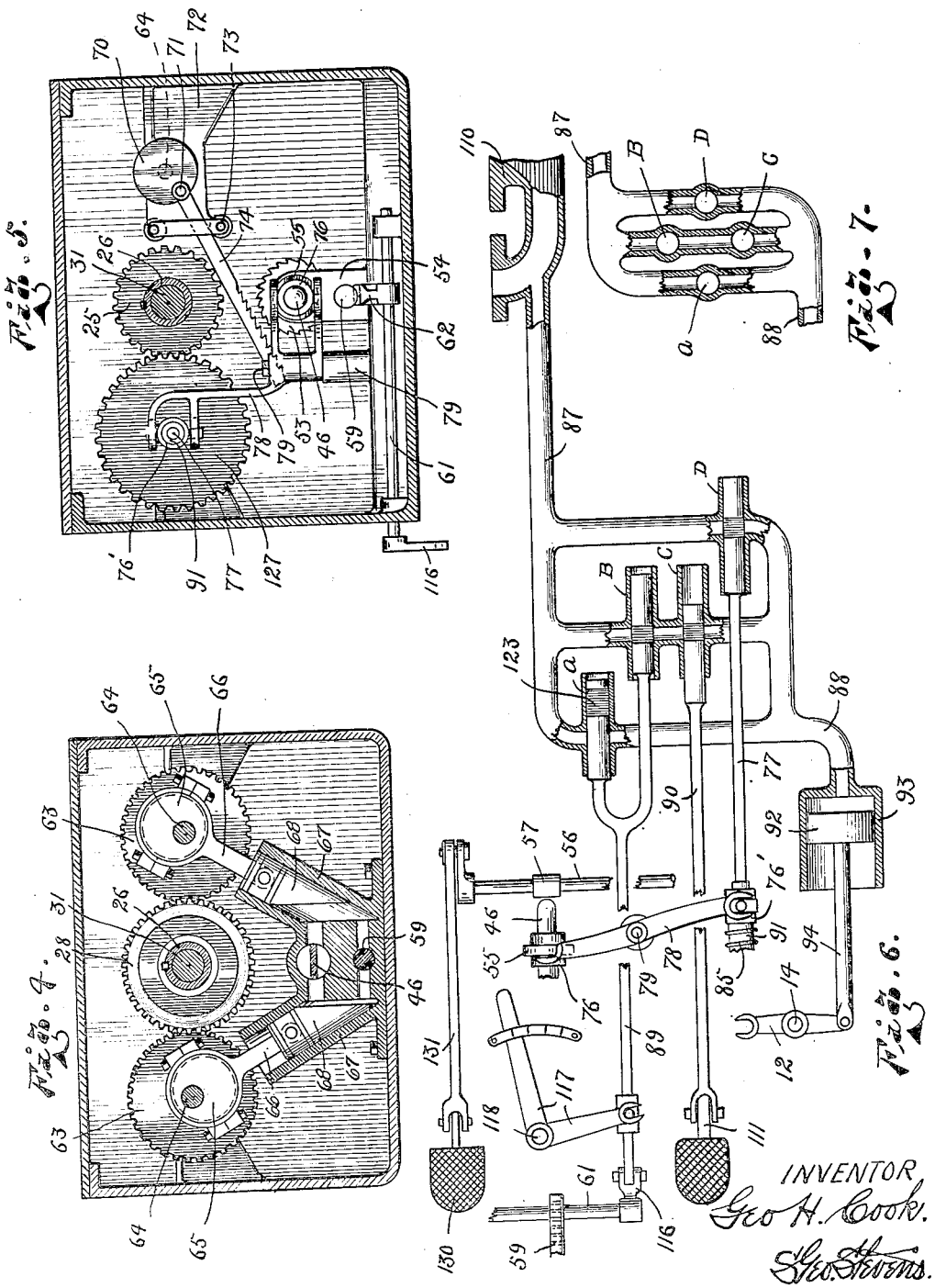
INVENTOR
Geo H. Cook.
Geo Stevens
ATTY.

Patented May 8, 1934

1,957,578

UNITED STATES PATENT OFFICE 1,957,578

SEMIAUTOMATIC TRANSMISSION

George H. Cook, Santa Barbara, Calif., assignor of one-fourth to Edward L. Abbott and one-fourth to Alaric J. Roberts, both of Santa Barbara, Calif.

Application October 24, 1932, Serial No. 639,264

12 Claims. (Cl. 74—34)

This invention relates to improvements in what may be termed semi-automatic transmissions, and more particularly to a three-speed planetary type of transmission for use in automotive vehicles, and which may be depended upon by its own mechanism to do all of the gear shifting from one ratio to another incident to normal motor vehicle driving other than that of starting the vehicle in motion in either forward or reverse direction.

The principal object of the invention is to provide such a transmission which may be absolutely depended upon to do the right thing at the right time by opening or closing a valve to hydraulic resistance, or an air valve between the intake manifold and a vacuum piston attached to the clutch throw-out in shifting the transmission gears from one ratio to another while the vehicle is moving.

Another object is to provide a transmission for such purpose which is absolutely fool proof, and of relatively simple and practical construction.

Still other objects and advantages of the invention will appear in the following description thereof.

Referring now to the accompanying drawings forming part of this application, and wherein like reference characters indicate like parts:

Figure 2 is a vertical section on the line 2—2, Figure 1, showing portions of the mechanism in elevation.

Figure 3 is a side elevation, partly in section, of a modified form of pedal controlled valve shaft.

Figure 4 is a reduced transverse section on the line 4—4, Figure 2.

Figure 5 is a section on the line 5—5, Figure 2, omitting the foot pedal arm and showing the fork lever connection 78 in elevation.

Figure 6 is a plan view of the control valves, partly broken away for convenience of illustration.

Figure 7 is a modified rearrangement of the four control valves and their cooperative connection.

Figure 1:
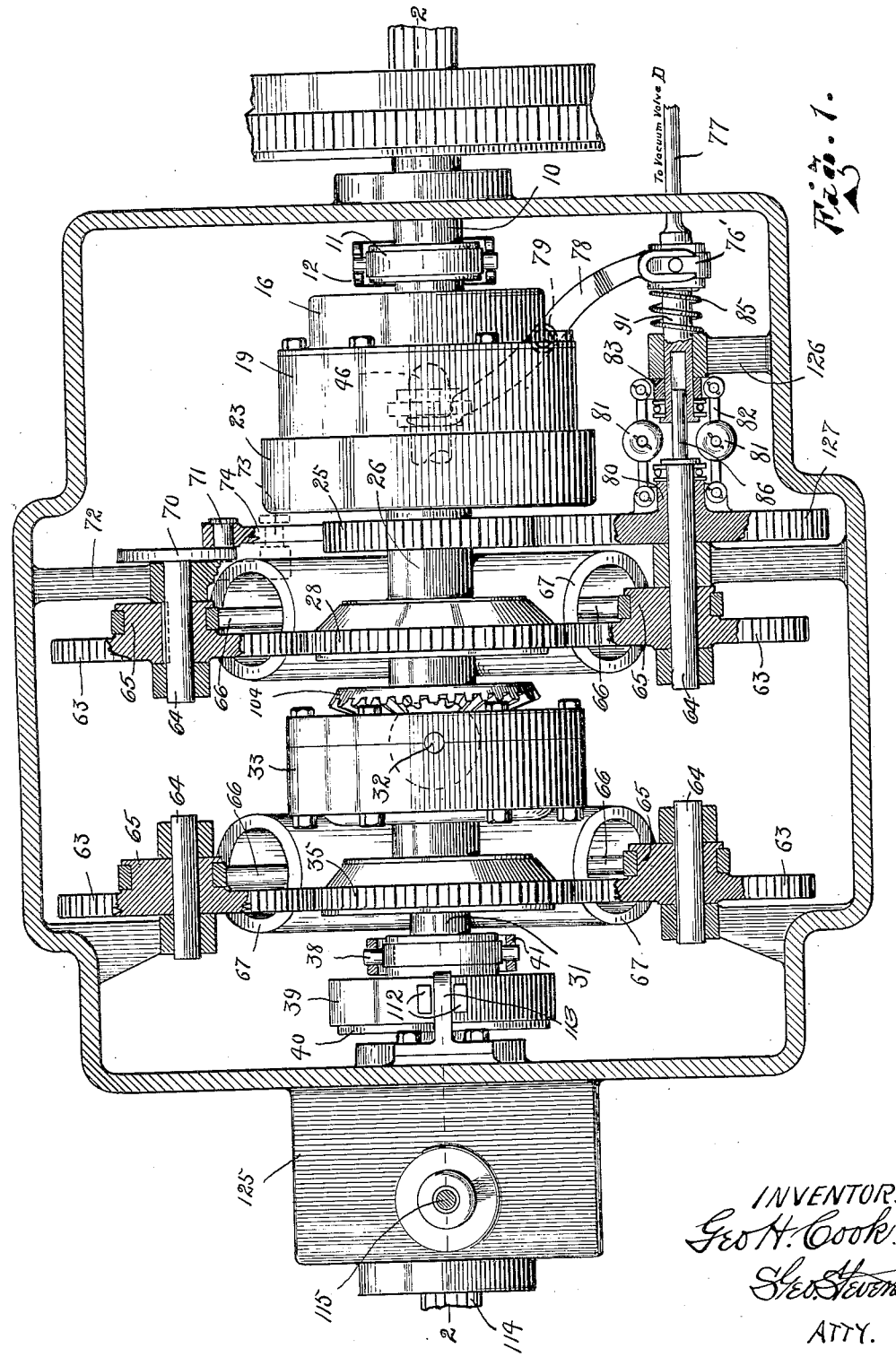
Figure 1 is a horizontal sectional view through the transmission case showing in top plan view the transmission mechanism, portions thereof being in section for convenience of illustration.

The unit, as will at once be obvious, is installed in a motor vehicle immediately to the rear of the fly wheel, and, as is common, is enclosed in a suitable housing for operation in oil in the usual manner. The drive shaft, indicated at 10, extends through the forward wall of the housing within suitable ball bearings installed therein, and the rear end of the drive shaft is reduced as at 100 and journalled within an axial bore in the somewhat enlarged end or hub of the driven shaft 31, upon which hub the radially disposed pinions 22 are mounted. The driven shaft 31 extends in axial alignment with the drive shaft and through a suitable bearing installed in the rear wall of the housing to a portion of a conventional transmission 125 which will be hereinafter described.

Referring now to the mechanism directly operative by the drive shaft and carried upon the adjacent ends of the two shafts, the gear housing 19 is rigidly fixed to the stepped ends of the shafts 22 and must at all times rotate with the driven shaft, one function of said housing being to hold the pinion gears 21 in place, and also provides the clutch disc face 101. The other part of the clutch comprises the springs 15, the annular disc 16, which is bolted to the gear housing, the friction disc 18, which latter is splined to the drive shaft 10, and the clutch control disc 17 operated by the dogs 13. The only function of this clutch assembly is that of making a direct drive connection, or "high" engagement with the engine, and which is automatically controlled by valve D and manually controlled through valve A. At all other times this clutch is held disengaged by vacuum from the intake manifold functioning through a suitable vacuum piston and connections illustrated at 92, 93, 94, etc., which will be described later, and portions of which mechanism are now in common use and well known as an automatic clutch. Additional functioning of this clutch mechanism will also be described later.

Abreast the forward end of the hub portion of the driven shaft 31 is mounted the bevel gear 20 which is keyed to the drive shaft 10, and which gear is constantly in mesh with the pinion gears 21 about the shafts 22, and the pinion gears 21 are also in constant mesh with the gear 24 which is identical with the gear 20. To the gear 24 is fixed the annular braking drum 23, controlled by a suitable band 102 and lever connection, not shown, when it is desired to use second gear against compression when descending a steep grade, and has no other functioning; the lever having a connection, not shown, to the fork lever 78 for control of the valve D.

Thus the gear assembly just described becomes the second or intermediate control and as illustrated has a ratio of 2 to 1 in favor of the drive shaft when the gear is held stationary. If a ratio other than 2 to 1 is desired it obviously is necessary to add another pinion gear to the hub of the gears 21, in which case gears 20 and 24 would be of different diameter instead of the same size as shown.

The gear 24 is provided with an elongated sleeve like hub 26 upon the driven shaft 31, which hub is provided with a dovetailed connection as shown in dotted lines at 103 with the hub of the gear 104; this latter being one of the bevel gears in the low gear assembly. Upon this elongated hub of the gear 24 is keyed, adjacent the second gear assembly, the spur gear 25, and the free wheeling assembly comprising the members 27, 28, 29 and 30, adjacent the gear 104, so that any control of this hub affects gears 24 and 104 alike. The bevel gear 34, opposed to the gear 104, is keyed to the driven shaft 31 and a pinion carrying hub 105 is mounted loosely upon the shaft 31 intermediate of the gears 104 and 34; the radial shafts upon this hub being illustrated at 32, they being fixed at their stepped ends to the housing 33, and the hub of this housing is elongated and surrounds the driven shaft 31. Upon the elongated hub of this housing 33 is keyed the free wheeling assembly comprising the elements 34', 35, 36 and 37. This assembly constitutes the low gear free wheeling unit, and when held stationary doubles the advantage obtained by the second or intermediate gear. For example, if second gear ratio is 2 to 1, the advantage is 1, but when doubled is 2, giving a low gear ratio of 3 to 1. With a second gear ratio of 1:75 to 1 low, doubled would be 3:50 to 1. We now have the mechanism comprising two planetary gear assemblies. When the gear 24 and shafts 32 are alternately held stationary second and low gear connections are accomplished respectively, and connected to each of these assemblies are free wheeling cams 30 and 37 which are free to revolve clockwise as viewed from the front at any time, but when revolving anti-clockwise or reverse to the shaft they must by necessity of their construction pull the gears 28 and 35 with them. Now each of these gears 28 and 35 mesh with two other gears 63, one on either side, see Fig. 4, and also Fig. 1, each mounted upon a shaft 64 supported in an arm extending from the sides of the transmission case, and driving a hydraulic piston 68 by means of an eccentric 65 and connecting rod 66; the hydraulic cylinders being illustrated at 67. These hydraulic pistons must of necessity either circulate oil from one cylinder to another or into an open reservoir not shown, but only when the valves in the intervening chambers 47 and 60 are open. Now as these valves close resistance is applied to the eccentrics 65 and gears 63 tending to hold gears 28 or 35 as the case may be from reversing. Thus control of the second free wheeling gear assembly 27, 28, 29, and 30, and control of the low gear assembly 35, 36, 37, are accomplished with but one valve in each valve chamber between each pair of pistons 68 of the hydraulic units.

Again referring to Figure 2, there is shown supported in the lower portion of the transmission case, a shaft 46 which both reciprocates and rotates, it being installed within the valve chambers of each pair of hydraulic pistons. Opposed sectors of this shaft as shown within the valves 47 and 51, Figure 2, are cut-away forming open ports for selective application within the valve chambers so that when presented within the valve chambers free passage of oil nevertheless is permitted between the cylinders. However, adjacent each cut-away portion, and designated at 50 adjacent the valve 51, the shaft is provided with a transverse through opening 106, and at 50' adjacent the valve 47 there is a blank portion of the shaft, so that when the valve shaft 46 is thrust forwardly the valve 47 is closed, while the valve 51 remains open until rotation of the shaft 46 is accomplished which will be described later, and at which time the opposed blank segments of the section 50 of the shaft also closes the valve 51 the same obviously being accomplished by a quarter turn only of the shaft.

To insure the valve shaft 46 assuming the proper position as shown in Figure 2 of the drawings when in its fully retracted position, an upstanding pin 107 is provided beneath same which engages the tapered end 108 of the enlargement 109 of said shaft. The rearmost bearing of the valve shaft 46 is accomplished by means of the inwardly protruding pin 43, while the opposite end of the shaft is mounted within the hub of the gear 53, the same being rotatable within the bracket-like extension 54 within the casing. Forwardly of this mounting of the valve shaft is attached the flanged collar 76 for engagement in one direction by the end of the lever 78 of the inertia valve rod which only opens the valve D in the connection between the manifold 110 (Fig. 6) and the vacuum cylinder 93; the flange of collar 76 being shown at 55.

The expansive helical spring 42, previously referred to, impinging at one end against the inner wall of the casing and at its smaller end against the drum like collar 45 fixed to the shaft, tends to bias the valve shaft 46 to a position just opposite to that shown in Figure 2, and to counteract this tendency the lever 57 is mounted upon the transverse shaft 56 which is controlled by left foot pedal 130 on rod 131.

A brake control lever 41, Fig. 2, is pivotally mounted as at 38 and spans the hub of the brake drum 39, while its free end is engaged intermediate of the flanges of the collar 45 on the valve shaft 46. This brake drum 39 has a pair of lugs 112 extending upwardly therefrom, intermediate of which is guided the inwardly extending lug 113 fixed to the inner wall of the casing so that it cannot turn but is free to reciprocate longitudinally of the driven shaft upon which it is freely mounted. The inner disc of this brake mechanism is illustrated at 40 and is keyed to the driven shaft 31 so that when the valve shaft 46 is forced to the position illustrated in Figure 2, braking stress will be applied to the driven shaft, causing the mechanism to function in a manner to be described later.

Intermediate of the normally stationary gears 53, in which the valve shaft 46 is supported at its forward end, and the valve 51, is fixed to the valve shaft 46 a contracting friction disc 52 for intermittent engagement with the face of the gear 53 when the valve shaft 46 is in its extreme forward position. This friction disc is for the purpose of imparting intermittent rotation to the valve shaft 46 by its contact with the intermittently rotating gear 53 for turning of the shaft so that the opposed circumferential sections of the portion 50 of the valve shaft will close the valve 51 to apply resistance to the turning of the free wheeling gear 28 and thus step up the ratio of the mechanism to second gear, it being understood that the reciprocating rack arm 74 (Fig. 5) attached to the crank cam 70 as at 71 and mounted upon the shaft 64, is functioning so as to cause such intermittent rotation of the ratchet gear 53. 72 is a bracket like support for the guide rollers of the rack arm 74 and the lower one of which is shown at 73 to cause it to properly function.

114 represents that portion of the power shaft extending from the transmission to the rear axle of the vehicle, and intermediate of it and the driven shaft 31 previously referred to is shown installed as at 125 that part of a conventional transmission necessary to sustain a direct forward, neutral, and reverse application of the power, the same being illustrated as in neutral, with the gear shaft lever extending upwardly therefrom as at 115.

In the lower forward part of the casing is illustrated mechanism for the manual control of the transmission when preferred, or if circumstances require same, and which effects the remainder of the transmission mechanism in exactly the same way as the automatic control. For such manual control I provide a valve chamber 60 in the second gear free wheeling hydraulic resistance unit, directly below the valve 51. This valve 60 is controlled by the reciprocable valve rod 59 geared upon the quadrant 62 mounted upon the transverse shaft 61, linked as at 116 to the rod 89, and operated by the manually controlled bell crank lever 117 pivoted as at 118, and which lever is preferably located just beneath the steering wheel of the vehicle in convenient access to the driver. It will be seen by reference to Figure 6 of the drawings, that the operation of this lever 117 simultaneously operates the control arm 89 of the valves A and B in the vacuum control system, and the auxiliary valve rod 59.

On this valve rod are indicated spaces 119, 120, 121, and 122, to designate the different selective positions of said rod for the various functioning of the mechanism. For example at 119 the valve rod is cut-away upon opposite sectors so that when positioned within the valve 60 free idling of the pistons is permitted, just as when the similarly cut-away spaces on the valve rod 46 function. But when the valve rod 59 is moved rearwardly until the space indicated at 122 is in the valve 60, the valve A in the vacuum system will be closed and the valve B open, and free wheeling is permitted. When the valve rod 59 is moved forwardly to the space marked 121, the valve 60 will be still closed, valve A closed, and valve B closed, and "high" gear connection accomplished. However when the valve rod is moved still farther forward until the space 120 on the rod 59 is in valve 60, it will still be closed, A open, and B closed, and we are in "second" gear. Then, finally, when the valve rod 59 is moved forwardly until the space 119 occurs in the valve 60, it will be open, valve A open, and B closed, and the mechanism operating in low.

It will be noted that the valves B and C in the vacuum system have no function other than to allow free wheeling of the mechanism and valve C attached to the foot throttle 111 is ineffective unless valve B is open, and when valve B is open valve C opens when foot is taken off of the throttle control 111 and closes as throttle is depressed, allowing the driven shaft to overrun the drive shaft at times when throttle is closed.

Valves A and B are operated in unison by rod 89 which is, as before stated, connected with the manual control valve shaft 59 in the bottom of the case and also connected to the quadrant control under the steering wheel. By this means the mechanism is effected manually identically with the automatic control and can be operated regardless of driving conditions and without respect to any other pedal or control.

The vertically lined sections indicated at 123 in all of the valves A, B, C, and D, indicate the through ports therein, which, when registering with the pipe openings allows the suction to pass therethrough, or opens the valves.

Either in the automatic or manual control, shifting up is accomplished by closing the valve controlling the gear desired, and shifting down is accomplished by opening the valve controlling the ratio next higher than the one desired, it being noted that the valve 47 remains closed at all times except when it is desired to stop, and 51 remains closed except when it is desired to stay in low, for example, on long heavy pull, or when in neutral and have optional manual control in respect to the valve 60 which precludes the necessity of holding the foot on the pedal when long pull in low is necessary.

The forked lever 78 is pivotally mounted as at 79 and connected at one end to the valve shaft 46 and at the other end to the collar 76' on the inertia control rod 91 and does not prevent the valve D from opening at any time, but assures said valve D being open when neutral is desired and the motor possibly racing at sufficient speed to close the valve by turning inertia weights through gear 25. Now as the mechanism is naturally free wheeling except when in "high", the friction drum indicated at 23 may be stopped by the friction band 102 operated by a suitable hand brake lever not shown. This to be done when it is desired to use "second" gear in compression descending a steep grade, and has no other function. This brake lever should of course be connected with the fork 78 so as to open valve D when the brake is set so as to hold drum and gear 24 stationary.

No provision is made to use compression in "low" gear as it is thought that same with present braking systems is superfluous.

It is now apparent that the operation of the valves A, B, C, and D will have a direct bearing upon the functioning of the vacuum cylinder 93 in control of the friction clutch previously referred to and the parts of which are indicated at 15, 16, 17, 18 and 19, for, only when any one of these valves, or two of them as the case may be, are open, will the clutch disengage, allowing either "low", "second", or free-wheeling, according to position of other valves; and that by virtue of the rod connection 94 to the fork arm 12, pivoted at 14, adjacent the drive shaft and operating the collar 11 thereupon by engagement with the dogs 13, the operation of which is clearly illustrated in Figure 1 of the drawings.

In Figure 3 is illustrated a modified form of valve shaft which might prove of advantage as against that shown at 46, and wherein an elongated port is indicated at 124 which would avoid the necessity of rotation of the shaft, and in operation would give three positions of the foot pedal 130, as follows: fully depressed, neutral; half depressed, low; and fully released, second or intermediate; depending on the same means as before described, to obtain high connection. This construction would allow elimination of parts 52, 53, 64, 70, 71, 72, 73 and 74.

The inertia unit, for automatically controlling valve D, located within the casing at one side of the forward end of the transmission assembly, comprises a forward extension of the shaft 64 upon that side of the assembly having a reduced pintle-like extension 86 thereupon which telescopes within the innermost end of the rod 91. This latter rod is reciprocably mounted within the inwardly extending bracket 126 and carries inwardly thereof the collar 83 for pivotal support of the forward ends of the inertia weight links 82, while the innermost connections of the inertia weight links are pivoted to the hub 80 of the driving gear 127 which is in constant mesh with the gear 25 keyed to the elongated hub 26 of the gear 24.

Operation

Assuming the motor to be idling and the gear shift assembly illustrated at 125 in neutral, all the mechanism supported by the drive and driven shafts, excepting the free wheeling gears 28 and 35, are revolving as a unit without transmitting power to any other portion of the mechanism. Now by depressing the operating left foot pedal 130 actuating the rod 131, attached to the cross shaft 56, which operates the control arm 57, the valve shaft 46 will be forced backwardly against the helical spring 42, when the flange of the drum 45 will engage the clutch lever 41 and apply sufficient friction through the clutch 39 and 40 to the driven shaft to stop same from revolving, thus overcoming the drag of gears and pistons with valves open. At this time cams 30 and gear 28 and pistons to which it is attached are reversing the same speed at which the driving shaft is revolving in the opposite direction. Cam 37 and gear 35 and their pistons will be reversing at half crank shaft speed. We now make the forward engagement of the gear shift lever assembly 125 by means of the common shift lever 115 and there it remains in said forward engagement until the end of the run. The foot pedal 130 had been depressed simultaneously with or immediately prior to the shifting of the gears in assembly 125, and in order to now start the car in forward motion the foot pedal is released, as is now customary in ordinary driving, when the valve shaft 46, by virtue of the effect of the spring 42 will first close the ports in the valve 47 of the rearmost "low" hydraulic unit which will set up resistance in same and finally stop gears 35 and cam 37, and also pinion shaft 32 from further motion, and we are then in low gear. Section 50 of the valve shaft 46 is then over the ports of the valve 51 of the intermediate hydraulic unit and this valve is therefore still open as previously described, so that it is necessary to rotate the shaft 46 a quarter turn in order to close the ports in said valve. As we have released the pedal, return spring 42 will force the shaft 46 still farther forward until the friction disc 52 engages with gear 53 which is being intermittently revolved by the cam and lever mechanism 70, 71, 72, 73, and 74, and by which mechanism it is possible to make the shaft 46 turn any number of degrees per each revolution of the cam crank 70. This crank is being driven by the gear 28, through gear 63, mounted upon a shaft 64, bracketed as at 72 within the casing, and which is reversing at one-third drive shaft speed. By this arrangement it is intended to have the valve 51 close after the car has traveled a given distance, say approximately six feet. However, if desired to travel farther than that distance in "low" it is but necessary to keep enough pressure on foot pedal to hold the friction disc 52 and gear 53 disengaged. Now having closed the valve 51 we have built up resistance sufficient to stop rotation of the gear 28 and cam 30 together with the gears 24 and 104 from further reversing, and also the assembly composed of members 64, 70, 71, 72, 73 and 74, from operating, and, as long as such pull is kept on drive shaft, they remain stationary. At this time cam 37 and radial shafts 32 are revolving forwardly at one-half driven shaft speed unresisted because of its free-wheeling device. Gear 25 driving the governor or inertia weights 81 which automatically closes the vacuum valve D through the pitman connection 77, is now also stationary and the vacuum suction is still holding the "high" connection clutch disengaged.

Obviously any desired speed may be attained in second gear, and if the foot is taken off the foot throttle or pedal the tendency is then for the driven shaft to overrun the drive shaft when the gear 25 accentuates the inertia weights, causing them to exert sufficient pull on the driven hub 83 and valve rod 77 to overcome tension of return spring 85 and close vacuum valve D. As valves A and B are normally closed, the closing of valve D cuts off all suction of intake manifold, releasing pull of vacuum cylinder 93 and allowing clutch spring 15 to engage plates 17 and 18, thereby constituting a direct drive of the two shafts, as previously described.

It is to be understood that the inertia weights 81 and the return spring 85 are to be so constructed as to require a car speed of twelve miles per hour to exert sufficient centrifugal force to hold valve D closed.

Assuming that at any time when the car speed slows to twelve miles per hour or below, valve D automatically opens, at which time the motor pull tends to slow up and stop rotation of the sleeve 26 and gear 24, and we are again in second until speed is once more built up and driven shaft is allowed to catch up by taking foot from foot throttle 111.

It is not necessary to again depress foot pedal 130 operating valve shaft 46 until it is desired to come to a dead stop.

Having thus described my invention, what I claim and desire to secure by Letters Patent, is:

1. A semi-automatic transmission unit including a drive shaft, a driven shaft, pinion shafts extending radially from said driven shaft, pinion gears upon said shafts, a housing loosely mounted on the drive shaft and fixed to said pinion shafts and revolvable therewith, and a clutch disc fixed to said drive shaft and engageable with said housing for establishing a direct drive from the drive to the driven shaft.

2. A semi-automatic transmission unit including drive and driven shafts, a pair of planetary gear units revolvable upon said shafts each comprising gears and pinions in constant mesh, a gear in one unit being keyed to the driven shaft and a gear in another unit being keyed to the drive shaft, hydraulically controlled means upon said driven shaft and attached to said pinions whereby holding the pinions of one unit from reversing establishes a low gear ratio between the two shafts, and said means including a free wheeling unit mounted upon said driven shaft.

3. A semi-automatic transmission unit including drive and driven shafts, planetary gear units upon said shafts each comprising gears and pinions in constant mesh, a gear in one unit being keyed to the driven shaft and a gear in another unit being keyed to the drive shaft, and the other gears of said units being joined so that they operate in unison, and hydraulically controlled free-wheeling units mounted upon said driven shaft for controlling certain gears in said units.

4. A semi-automatic transmission unit including drive and driven shafts, planetary gear units operatively connected together and mounted upon said shafts, each unit comprising gears and pinions in constant mesh, a free-wheeling unit operatively connected to the pinions of one unit to optionally hold same from reversing, and a similar free wheeling unit for optionally holding a gear of another unit from reversing.

5. A semi-automatic transmission unit including aligned drive and driven shafts, planetary gear units operatively connected together each comprising gears and pinions in constant mesh mounted upon said shafts, and resistance means upon the driven shaft and connected to and selectively holding the pinions of one unit from reversing and thereby establishing a low gear ratio between the shafts.

6. A semi-automatic transmission unit including drive and driven shafts, planetary gear units each comprising gears and pinions in constant mesh mounted upon said shafts, a gear of one unit being operable in unison with a gear of another unit, means upon the driven shaft and connected to and optionally holding the pinions of one unit from reversing and thereby establish low gear ratio between the shafts, and similar means upon the driven shaft and connected to and optionally holding said gears operable in unison from reversing and thereby establish intermediate gear ratio between the shafts.

7. A semi-automatic transmission unit including drive and driven shafts, planetary gear units each comprising gears and pinions in constant mesh mounted upon said shafts, means upon the driven shaft, connected to and for selectively holding the pinions of one unit from reversing to establish low gear ratio between the shafts, like means whereby holding a gear of another unit from reversing establishes intermediate gear ratio between the shafts, and means for establishing a direct driving connection between the two shafts, said last mentioned means including a housing connected to one of said gear units, and a clutch disc keyed to said drive shaft and engageable with said housing.

8. A transmission mechanism of the type described including drive and driven shafts, a planetary gear unit directly connected to each shaft, a separate hydraulic unit associated with each gear unit, and over-running clutches upon the driven shaft each cooperatively connected with a gear in its respective gear unit to eliminate drag of the hydraulic units when circumstances permit.

9. A semi-automatic transmission mechanism of the type described including drive and driven shafts, a planetary gear unit directly connected to each shaft, over-running clutches upon the driven shaft each cooperatively associated with a gear in its respective planetary gear unit, and a separate hydraulic unit directly connected with each over-running clutch.

10. A semi-automatic transmission mechanism of the type described including drive and driven shafts, a planetary gear unit directly connected with each shaft, over-running clutches upon the driven shaft each connected with a gear in its respective planetary gear unit, a separate hydraulic unit directly connected with each over-running clutch, and means for the control of said hydraulic units.

11. A semi-automatic transmission mechanism of the type described including drive and driven shafts, a planetary gear unit directly connected with each shaft, an over-running clutch connected with and controlling the operation of a gear in each planetary gear unit, a hydraulic unit connected with and controlling the operation of each over-running clutch, a slidable and rotatable valve shaft for control of the hydraulic units, and means for rotating said valve shaft.

12. A semi-automatic transmission unit including a drive shaft, a driven shaft, pinion shafts extending radially from said driven shaft, a housing fixed to said pinion shafts and revolvable therewith, and a clutch disc keyed to said drive shaft and slidably engageable with said housing for establishing a direct drive from the drive to the driven shaft.

GEORGE H. COOK.